US011976806B2

(12) United States Patent
Hurin et al.

(10) Patent No.: US 11,976,806 B2
(45) Date of Patent: May 7, 2024

(54) HEADLAMP

(71) Applicant: TECHTRONIC CORDLESS GP, Anderson, SC (US)

(72) Inventors: Shane E. Hurin, Peidmont, SC (US); Jacob Wagner, Greenville, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/353,259

(22) Filed: Jul. 17, 2023

(65) Prior Publication Data

US 2024/0027057 A1 Jan. 25, 2024

Related U.S. Application Data

(60) Provisional application No. 63/391,222, filed on Jul. 21, 2022.

(51) Int. Cl.

*F21V 21/00* (2006.01)
*F21L 4/04* (2006.01)

(Continued)

(52) U.S. Cl.

CPC .............. *F21V 21/084* (2013.01); *F21L 4/04* (2013.01); *F21L 4/08* (2013.01); *F21V 23/002* (2013.01);

(Continued)

(58) Field of Classification Search

CPC .. F21V 21/084; F21V 23/002; F21V 23/0407; F21V 23/0414; F21L 4/04; F21L 4/08; H05B 47/17

See application file for complete search history.

(56) References Cited

U.S. PATENT DOCUMENTS 5,667,294 A 9/1997 Lo
5,836,673 A 11/1998 Lo (Continued)

FOREIGN PATENT DOCUMENTS

CN 105444022 A 3/2016
CN 205919149 U 2/2017

(Continued)

OTHER PUBLICATIONS

"Pluralla LED Headlamp, Rechargeable Headlamps with 230° Wide Beam Headlight with Motion Sensor Bright 5 Modes Lightweight Sweat Proof Head Flashlight for Outdoor Running, Camping, Fishing, Hiking-Grey" https://www.amazon.com/Pluralla-Rechargeable-Lightweight-Flashlight-Hiking-Grey/dp/B09MFB1225?th=1 (Year: 2021).*

(Continued)

*Primary Examiner* — Gerald J Sufleta, II

(74) *Attorney, Agent, or Firm* — Michael Best & Friedrich LLP

(57) ABSTRACT

A headlamp includes a first light assembly including a first LED operable in a first plurality of lighting modes and a second light assembly electrically coupled to the first light assembly. The second light assembly includes a second LED operable in a second plurality of lighting modes, a battery receptacle configured to receive a battery pack, and an actuator operable to toggle the first LED between the first plurality of lighting modes and the second LED between the second plurality of lighting modes.

20 Claims, 8 Drawing Sheets

(51) Int. Cl.

| | |
|---|---|
| ***F21L 4/08*** | (2006.01) |
| ***F21V 21/084*** | (2006.01) |
| ***F21V 23/00*** | (2015.01) |
| ***F21V 23/04*** | (2006.01) |
| ***H05B 47/17*** | (2020.01) |
| *F21V 21/08* | (2006.01) |
| *F21Y 113/10* | (2016.01) |
| *F21Y 115/10* | (2016.01) |

(52) U.S. Cl.

CPC ...... *F21V 23/0407* (2013.01); *F21V 23/0414* (2013.01); *H05B 47/17* (2020.01); *F21V 21/0816* (2013.01); *F21Y 2113/10* (2016.08); *F21Y 2115/10* (2016.08)

(56) References Cited

U.S. PATENT DOCUMENTS

| | | | | |
|---|---|---|---|---|
| 8,113,677 | B2 | 2/2012 | Carpenter | |
| D685,938 | S | 7/2013 | Baker et al. | |
| 8,529,082 | B1 | 9/2013 | Baker et al. | |
| 9,103,539 | B2 | 8/2015 | Baker et al. | |
| D742,049 | S | 10/2015 | Baker et al. | |
| 9,271,343 | B2 | 2/2016 | Mackool et al. | |
| 9,546,779 | B2 | 1/2017 | Rementer | |
| 9,737,105 | B2 | 8/2017 | Baker et al. | |
| 9,829,182 | B1 | 11/2017 | McCaslin et al. | |
| D809,686 | S | 2/2018 | Royal et al. | |
| 9,986,778 | B2 | 6/2018 | Baker et al. | |
| 10,561,188 | B2 | 2/2020 | Baker et al. | |
| 10,650,655 | B2 | 5/2020 | Royal et al. | |
| 10,709,189 | B1 | 7/2020 | Baker et al. | |
| 10,779,598 | B1 | 9/2020 | Baker et al. | |
| 10,859,245 | B2 | 12/2020 | Gall et al. | |
| 10,907,776 | B1 | 2/2021 | Haddad | |
| 10,948,171 | B2 | 3/2021 | Gall et al. | |
| 10,955,119 | B2 | 3/2021 | Cheng | |
| 11,019,869 | B1 | 6/2021 | Cozzone et al. | |
| 11,215,343 | B2 | 1/2022 | Gall et al. | |
| 11,291,260 | B2 | 4/2022 | Baker et al. | |
| 11,300,278 | B2 | 4/2022 | Hur | |
| 2003/0117575 | A1* | 6/2003 | Waters ................ | F21V 21/0885 351/158 |
| 2008/0298048 | A1 | 12/2008 | Garrity et al. | |
| 2016/0088890 | A1 | 3/2016 | Armagh | |
| 2016/0187654 | A1* | 6/2016 | Border ............... | G02B 27/0172 359/630 |
| 2017/0276856 | A1 | 9/2017 | Gagneux | |
| 2018/0058681 | A1 | 3/2018 | Arave et al. | |
| 2018/0303186 | A1 | 10/2018 | Baker et al. | |
| 2019/0208854 | A1* | 7/2019 | Teetzel ................. | A42B 3/0433 |
| 2019/0390844 | A1 | 12/2019 | Sedlacek et al. | |
| 2019/0390845 | A1* | 12/2019 | Ljunggren ................ | F21L 4/04 |
| 2021/0056825 | A1 | 2/2021 | Royal et al. | |
| 2021/0215326 | A1 | 7/2021 | Besley et al. | |
| 2021/0386154 | A1 | 12/2021 | Baker et al. | |
| 2022/0120418 | A1 | 4/2022 | Gall et al. | |
| 2022/0357023 | A1* | 11/2022 | Doughty .................. | A42B 3/30 |

FOREIGN PATENT DOCUMENTS

| | | | |
|---|---|---|---|
| CN | 206159879 | U | 5/2017 |
| CN | 208519710 | U | 2/2019 |
| CN | 109630923 | A | 4/2019 |
| CN | 209511645 | U | 10/2019 |
| CN | 209744116 | U | 12/2019 |
| CN | 212617713 | U | 2/2021 |
| CN | 213089479 | U | 4/2021 |
| CN | 213299662 | U | 5/2021 |
| CN | 213299664 | U | 5/2021 |
| CN | 214306610 | U | 9/2021 |
| CN | 216345555 | U | 4/2022 |
| DE | 202007006347 | U1 | 8/2007 |
| WO | DM094808 | | 5/2017 |
| WO | DM210424 | | 10/2020 |
| WO | 2021097348 | A1 | 5/2021 |

OTHER PUBLICATIONS

Extended European Search Report for Application No. 23185765.7 dated Nov. 13, 2023 (13 pages).

Energizer, "Energizer Headlamp Rechargeable S400, Led WideBeam Head Light, IPX4 Water Resistant Ultra Bright Headlamps for Camping, Outdoors, Emergency Power Outage (USB Cable Included)," <https://www.amazon.com/Energizer-Rechargeable-Resistant-Headlamps-Emergency/dp/B09N5QHX7M/ref=asc_df_B09N5QHX7M/?tag=hyprod-20&linkCode=df0&hvadid=563663820619&hvpos=&hvnetw=g&hvrand=3050939127205782222 &hvpone=&hvptwo=&hvqmt=&hvdev=c&hvdvcmdl=&hvlocint=&hvlocphy=9007754&hvtargid=pla-1626477848633&psc=1&mcid=15f6374441cf3b878328e8e8cda150fd&gclid= EAIaIQobChMIrKTt4qmVhQMVCktHAR1q-w6VEAQYASABEgLTPfD_BwE> web page visited Mar. 28, 2024 (8 pages).

* cited by examiner

HEADLAMP

CROSS-REFERENCE TO RELATED APPLICATIONS

This application claims priority to U.S. Provisional Patent Application No. 63/391,222, filed on Jul. 21, 2022, the entire contents of which are incorporated by reference herein.

FIELD OF THE DISCLOSURE

The present disclosure relates to lighting systems, and more particularly to headlamps.

BACKGROUND OF THE DISCLOSURE

Headlamps are typically configured to be attached to a user's head or to a hardhat via an attachment mechanism. Headlamps include a light source, which may, for example, include a single LED or a plurality of LEDs. The light source is configured to illuminate an area in front of the user. Some headlamps may include a battery pack attached to the headlamp and electrically coupled to the light source to provide power to the light source.

SUMMARY OF THE DISCLOSURE

The present disclosure provides, in one aspect, a headlamp that includes a first light assembly including a first LED operable in a first plurality of lighting modes and a second light assembly electrically coupled to the first light assembly. The second light assembly includes a second LED operable in a second plurality of lighting modes, a battery receptacle configured to receive a battery pack, and an actuator operable to toggle the first LED between the first plurality of lighting modes and the second LED between the second plurality of lighting modes.

The present disclosure provides, in another aspect, a headlamp that includes a first light assembly including a first LED and a second light assembly electrically coupled to the first light assembly. The second light assembly includes a housing, a battery pack positioned within the housing, a circuit board positioned between the battery pack and the housing, a second LED supported by the circuit board, a support pad positioned on the battery pack and engaging the circuit board to maintain a space therebetween, and an actuator operable to control operation of the first LED and the second LED.

The present disclosure provides, in another aspect, a headlamp that includes a strap configured to conform to a user's head or to a hardhat, and a first light assembly coupled to the strap. The first light assembly includes a flexible housing and a plurality of first LEDs operable in a first plurality of lighting modes. The headlamp includes a second light assembly coupled to the strap and spaced apart from the first light assembly. The second light assembly includes a second LED operable in a second plurality of lighting modes, a battery receptacle configured to receive a battery pack, and an actuator operable to toggle the plurality of first LEDs between the first plurality of lighting modes and the second LED between the second plurality of lighting modes based upon an amount of time the actuator is depressed. The headlamp also includes a wire extending from the second light assembly to the first light assembly to electrically couple the battery receptacle to the plurality of first LEDs.

Other features and aspects of the disclosure will become apparent by consideration of the following detailed description and accompanying drawings.

DETAILED DESCRIPTION

Figure 1A:
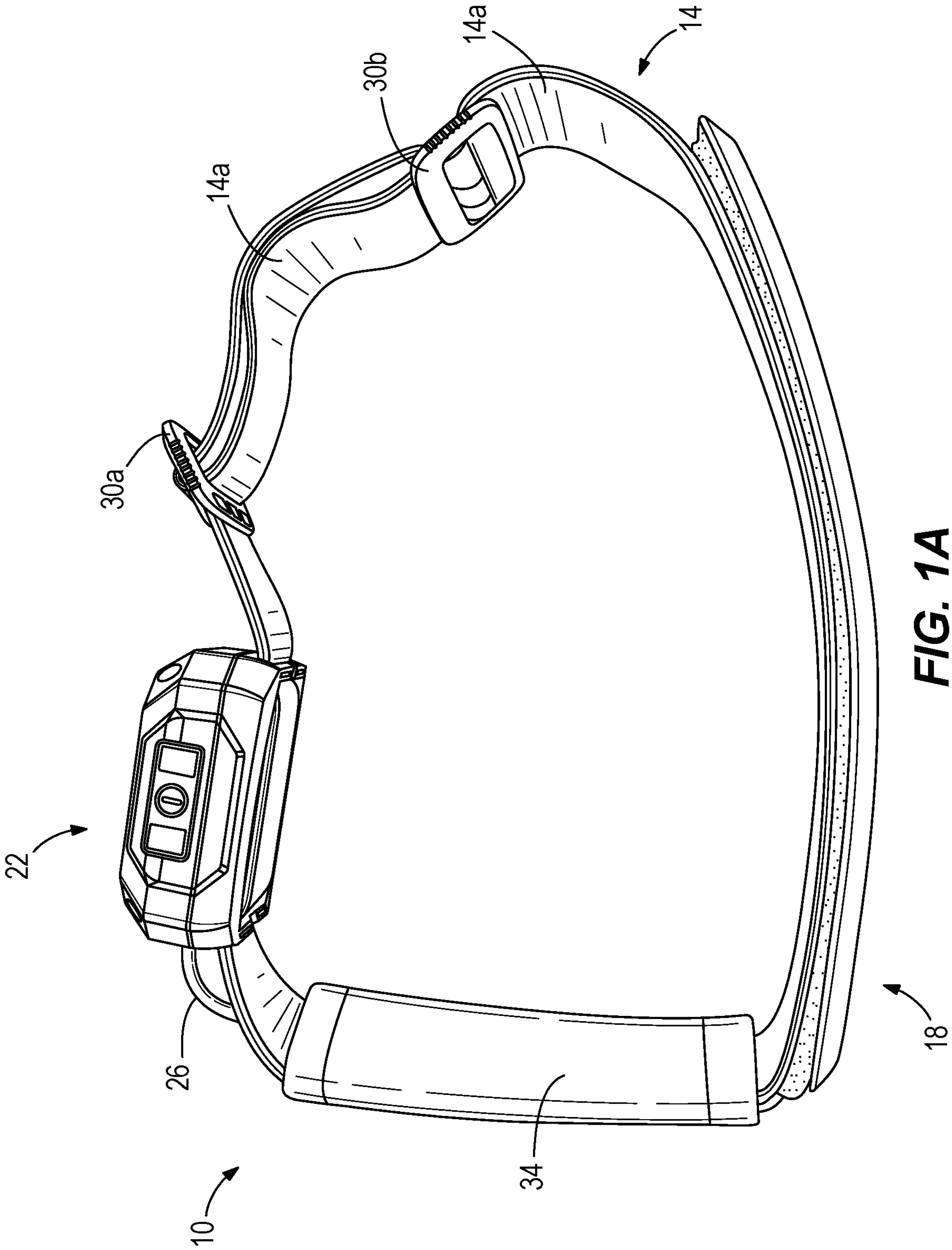
FIG. 1A is a perspective view of a headlamp in accordance with an embodiment of the disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as “generally,” “approximately,” or “substantially,” include values within ten percent greater or less than the stated value. When used in the context of an angle or direction, such terms include within ten degrees greater or less than the stated angle or direction. For example, “generally vertical” includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Figure 1B:
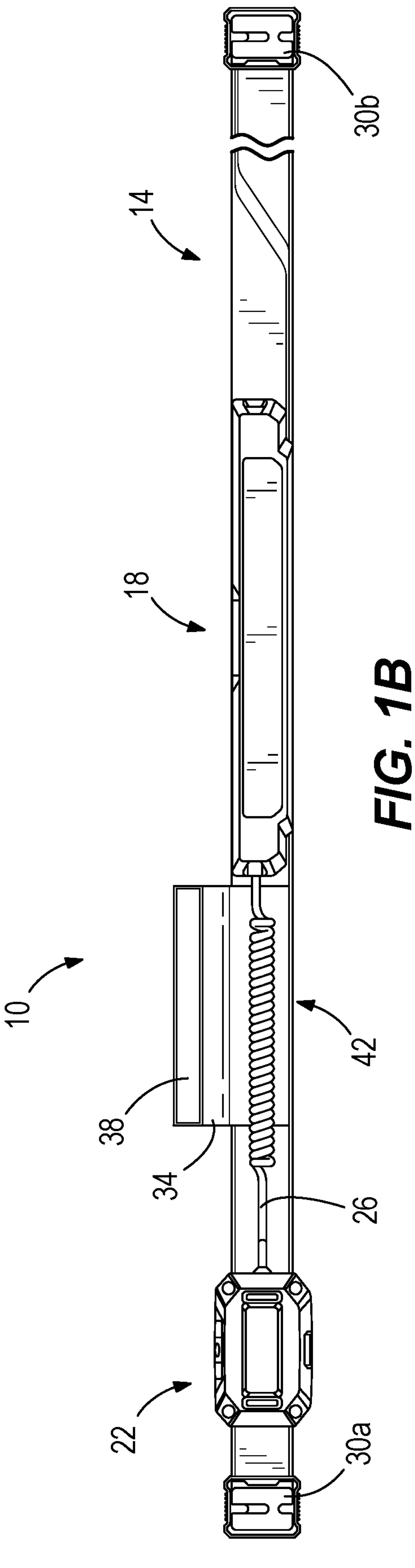
FIG. 1B is a front view of the headlamp of FIG. 1A.

FIGS. 1A and 1B illustrate a headlamp 10. The headlamp 10 is configured to selectively illuminate an area, such as a workspace. The illustrated headlamp 10 includes a strap 14 for coupling the headlamp 10 to a user's head or a hardhat, a first light assembly 18 coupled to the strap 14, and a second light assembly 22 coupled to the strap 14. The first light assembly 18 is electrically connected to the second light assembly 22 by an insulated wire 26 or other suitable connector. The first light assembly 18 is spaced apart from the second light assembly 22 when coupled to the strap 14. In the illustrated embodiment, the first light assembly 18 is a front light assembly. In other words, when the headlamp 10 is attached to the user's head or the hardhat, the first light assembly 18 is positioned toward a front side of the user. In other embodiments, the first light assembly 18 may be positioned elsewhere. In the illustrated embodiment, the second light assembly 22 is a rear light assembly. In other words, when the headlamp 10 is attached to the user's head or the hardhat, the second light assembly 22 is positioned toward a rear side of the user opposite the front side of the user. In other embodiments, the second light assembly 22 may be positioned elsewhere. In another example, the first light assembly 18 may be positioned at a left side of the user and the rear light assembly 22 may be positioned at a right side of the user. The first light assembly 18 and the second light assembly 22 may be positioned at any location around the strap 14 such that the first light assembly 18 is spaced from the second light assembly 22. In some embodiments, the headlamp 10 may include more light assemblies, such as, for example, a third light assembly or a fourth light assembly.

In the illustrated embodiment, the strap 14 comprises an elastic material that can be stretched to surround the user's head or the hardhat. The strap 14 is configured to be secured or conform to a user's head or to the hardhat. In other embodiments, the strap 14 may be a semi-rigid flexible material. The strap 14 includes a main portion 14*a* and an adjustable portion 14*b*. The main portion 14*a* of the strap 14 includes a first end and a second end. The first end of the main portion 14*a* of the strap 14 is coupled to a first slide buckle 30*a*, and the second end of the main portion 14*a* of the strap 14 is coupled a second slide buckle 30*b*. The adjustable portion 14*b* of the strap 14 is attached to both the first slide buckle 30*a* and the second slide buckle 30*b* such that the strap 14 forms a loop. The adjustable portion 14*b* may be elongated or shortened by adjusting the attachment of the adjustable portion 14*b* to either of the first or second slide buckles 30*a*, 30*b*. In other embodiments, the adjustable portion 14*b* may include other adjustment mechanisms. A flap 34 is fixedly coupled to the strap 14 at a first end of the flap 34. The flap 34 includes a first fastener portion 38 (e.g., a hook and loop fastener, such as Velcro®, snaps, etc.) on a second end of the flap 34, and the strap 14 includes a corresponding second fastener portion 42. When the first fastener portion 38 is coupled to the second fastener portion 42, the strap 14 and the flap 34 form a sleeve that partially surrounds the insulated wire 26. In particular, the strap 14 and the flap 34 surround a coiled section of the insulated wire 26.

Figure 2A:
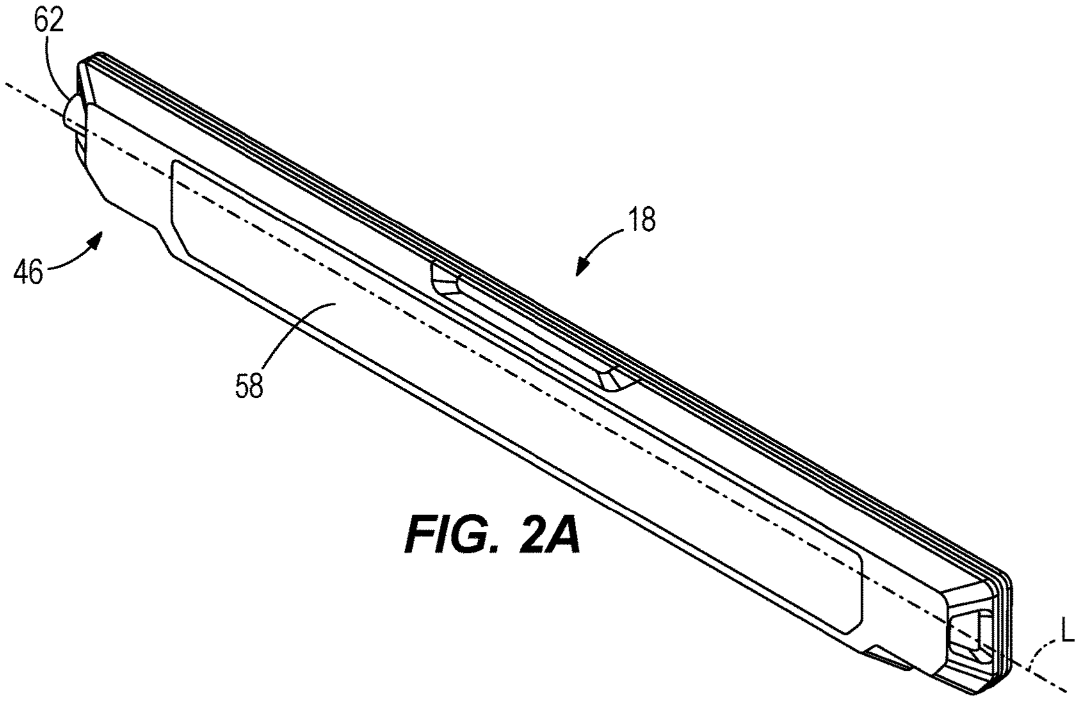
FIG. 2A is an enlarged perspective view of a first light assembly of the headlamp of FIG. 1A.
Figure 2B:
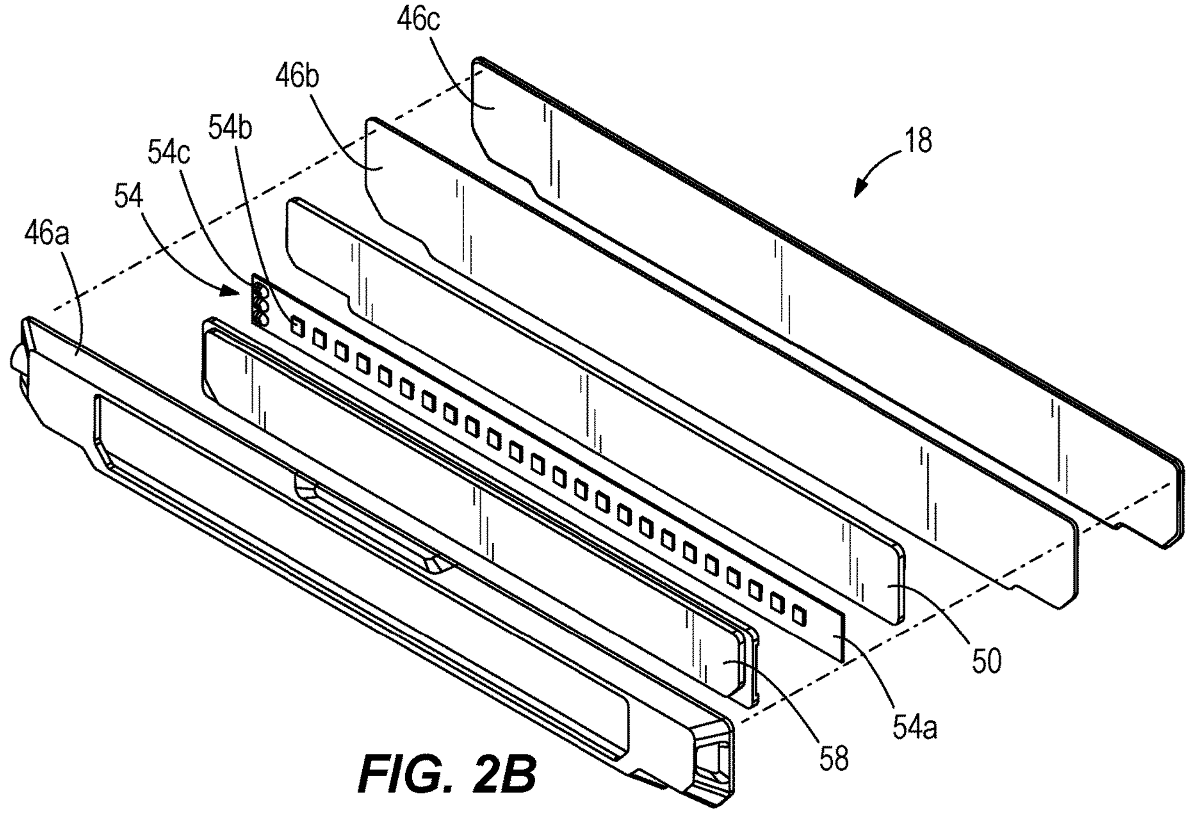
FIG. 2B is an exploded perspective view of the first light assembly of the headlamp of FIG. 1A.

FIGS. 2A and 2B illustrate the first light assembly 18 of the headlamp 10. The first light assembly 18 includes a housing 46 comprising a front housing portion 46*a*, a back housing portion 46*b*, and an attachment piece 46*c*. In the illustrated embodiment, the front housing portion 46*a* is fixed or joined to a front side of the back housing portion 46*b* by an adhesive, and the attachment piece 46*c* is fixed to a back side of the back housing portion 46*b* by an adhesive. In other embodiments, another attachment method may be used, such as screws or ultrasonic welding, for example. In the illustrated embodiment, the attachment piece 46*c* is fixedly attached/coupled to the strap 14. In other embodiments, the attachment piece 46*c* (or another piece of the housing 46) may be removably attached/coupled or slidably attached/coupled to the strap 14. The housing 46 of the first light assembly 18 is elongate and extends along a longitudinal axis L when the first light assembly 18 is undeformed. In other words, the housing 46 extends across at least 10% of the strap 14. In some embodiments, the housing 46 extends across at least 20% of the strap 14. In other embodiments, the housing 46 extends across at least 30% of the strap. Additionally, the housing 46 extends across less than 50% of the strap 14. Furthermore, the housing 46 comprises a flexible plastic. Accordingly, the housing 46 can be deformed and will bend to fit the shape of the user's head or the hardhat when the strap 14 is attached to the user's head or the hardhat.

The first light assembly 18 further includes a support piece 50 disposed within the housing 46 and coupled to the back housing portion 46*b*. An LED strip 54 is coupled to the support piece 50. The LED strip 54 includes a base 54*a* and at least one LED 54*b* (i.e., an LED chip, also referred to herein as “at least one front LED 54*b*”) coupled to the base 54*a*. The LED 54*b* may also be referred to as a first LED 54*b*. The at least one front LED 54*b* of the first light assembly 18 is configured to operate in a first plurality of lighting modes, as will be described in more detail below. In the illustrated embodiment, the at least one front LED 54*b* includes a plurality of LEDs (i.e., LED chips) coupled to the base 54*a*. The plurality of LEDs 54*b* are configured to illuminate an area in front of the user when the headlamp 10 is attached to the user's head or the hardhat. In some embodiments, the LEDs 54*b* may be configured to emit white light (e.g., by use of a phosphor, lens, or the like). In the illustrated embodiment, the plurality of LEDs 54*b* are distributed uniformly on the base 54*a* in a single line parallel to the longitudinal axis L of the housing 46. In other words, the plurality of LEDs 54*b* are arranged on the base 54*a* in a line parallel to the longitudinal axis L of the housing 46. In other embodiments, the plurality of LEDs 54*b* may be distributed otherwise on the base 54*a*. For example, the plurality of LEDs 54*b* may be distributed on the base 54*a* in two or more lines, or the plurality of LEDs 54*b* may be distributed in clusters on the base 54*a*. A lens 58 is received by the front housing portion 46*a* to cover and protect the LED strip 54. In the illustrated embodiment, the lens 58 is a transparent plastic. The support piece 50, LED strip 54, and lens 58 are all flexible. Accordingly, the support piece 50, LED strip 54, and lens 58 can be bent or deformed with the housing 46.

The front housing portion 46*a* defines an aperture 62 sized to receive the insulated wire 26. The aperture 62 is located on a side or end of the front housing portion 46*a*. The LED strip 54 includes an electrical attachment portion 54*c* for coupling to the insulated wire 26. As such, the LED strip 54 is electrically connected to the second light assembly 22 by the insulated wire 26.

FIGS. 3A-3D illustrate the second light assembly 22 of the headlamp 10. The second light assembly 22 includes a housing 66 comprising a first housing portion 66*a* and a second housing portion 66*b*. In the illustrated embodiment, the first housing portion 66*a* is coupled to the second housing portion 66*b* by four fasteners 70 (e.g., screws or the like). The second housing portion 66*b* includes a pair of apertures 74, within which the strap 14 is received. As such the second light assembly 22 is slidable along the strap 14. Moreover, slots 78 are adjacent each of the apertures 74, such that strap 14 can be attached to and removed from the apertures 74 without completely threading the strap 14 through the apertures 74. As such, the second light assembly 22 is removable from the strap 14.

Figure 3A:
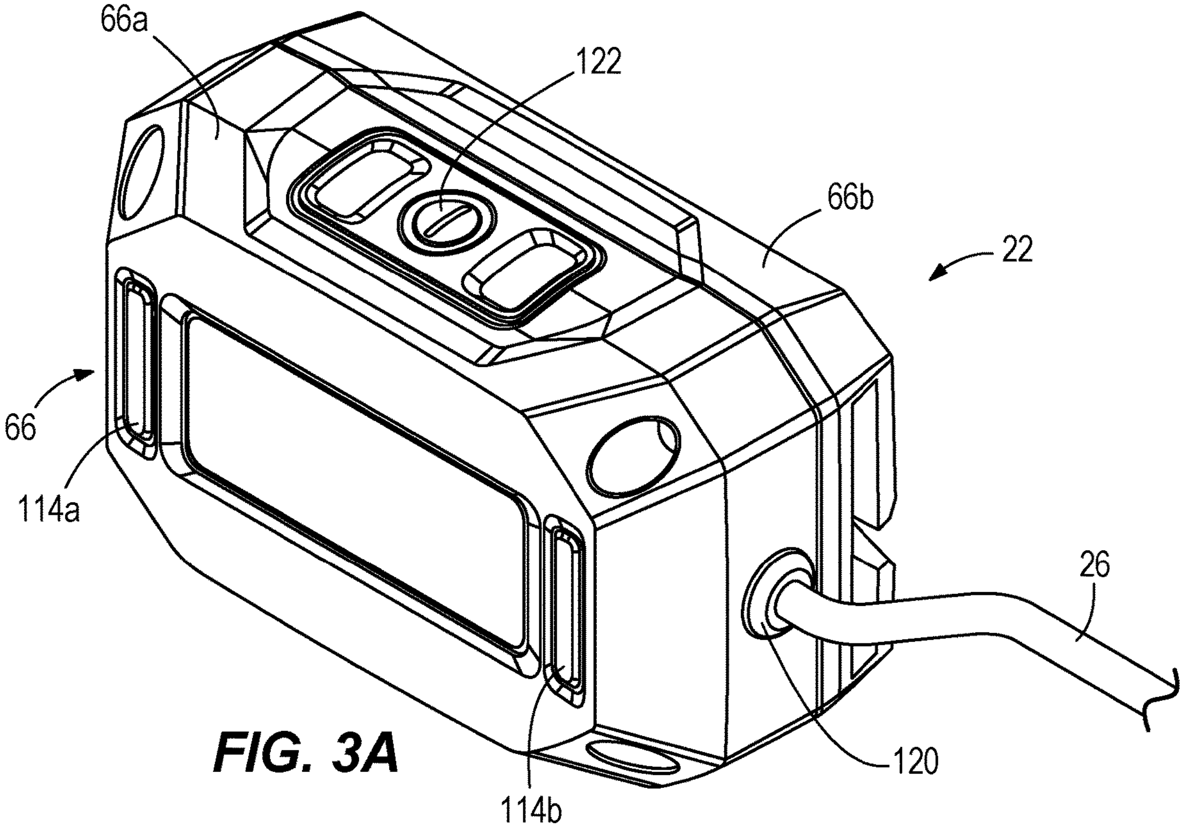
FIG. 3A is an enlarged perspective view of a second light assembly of the headlamp of FIG. 1A.
Figure 3B:
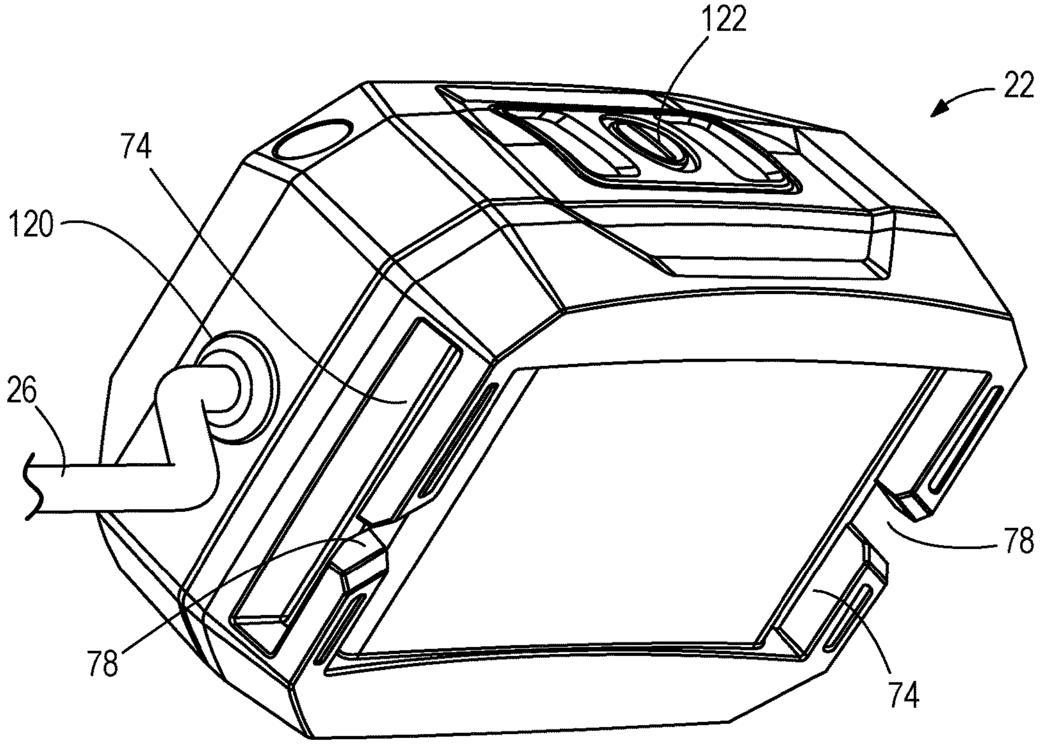
FIG. 3B is another enlarged perspective view of the second light assembly of the headlamp of FIG. 1A.
Figure 3C:
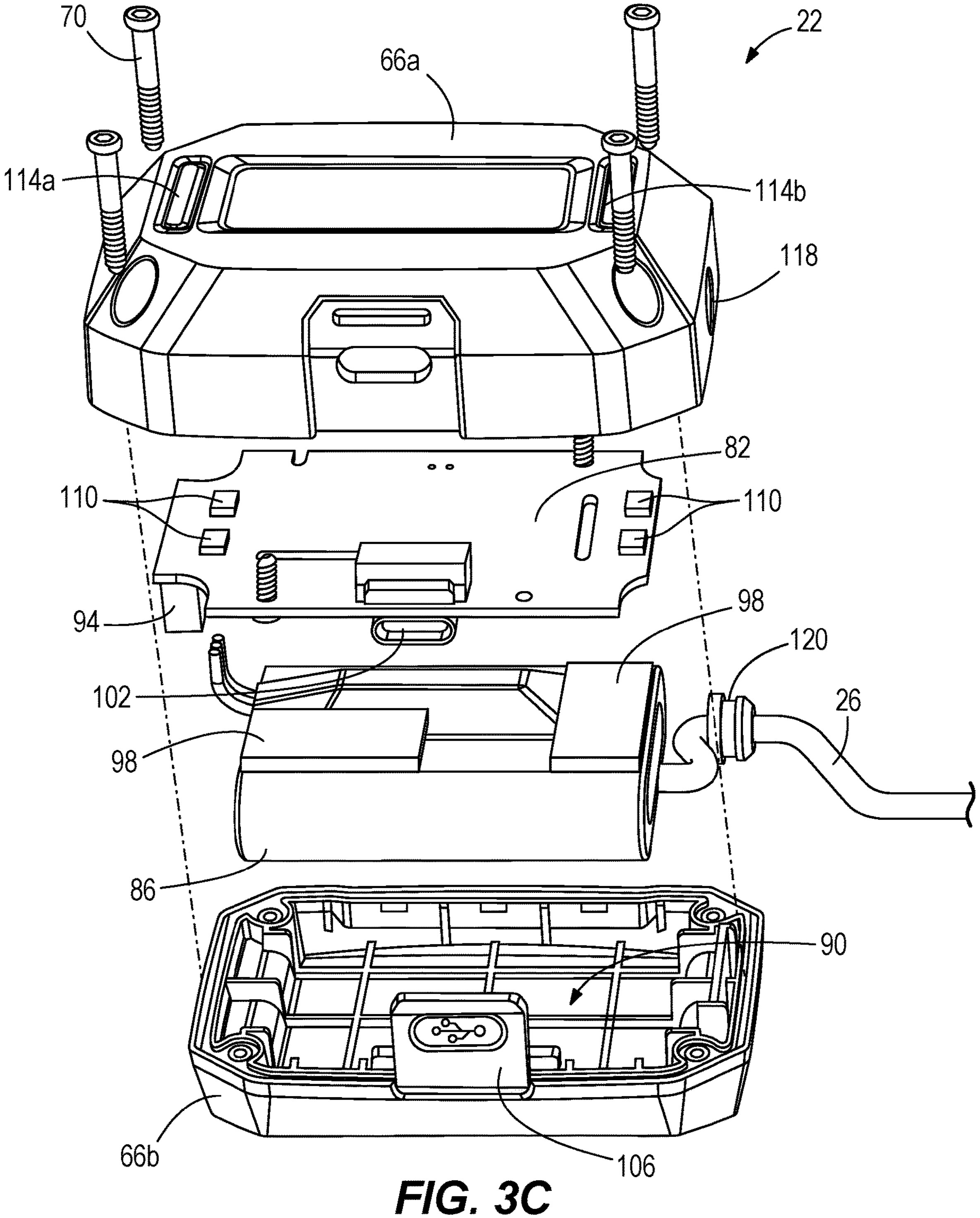
FIG. 3C is an exploded perspective view of the second light assembly of the headlamp of FIG. 1A.
Figure 3D:
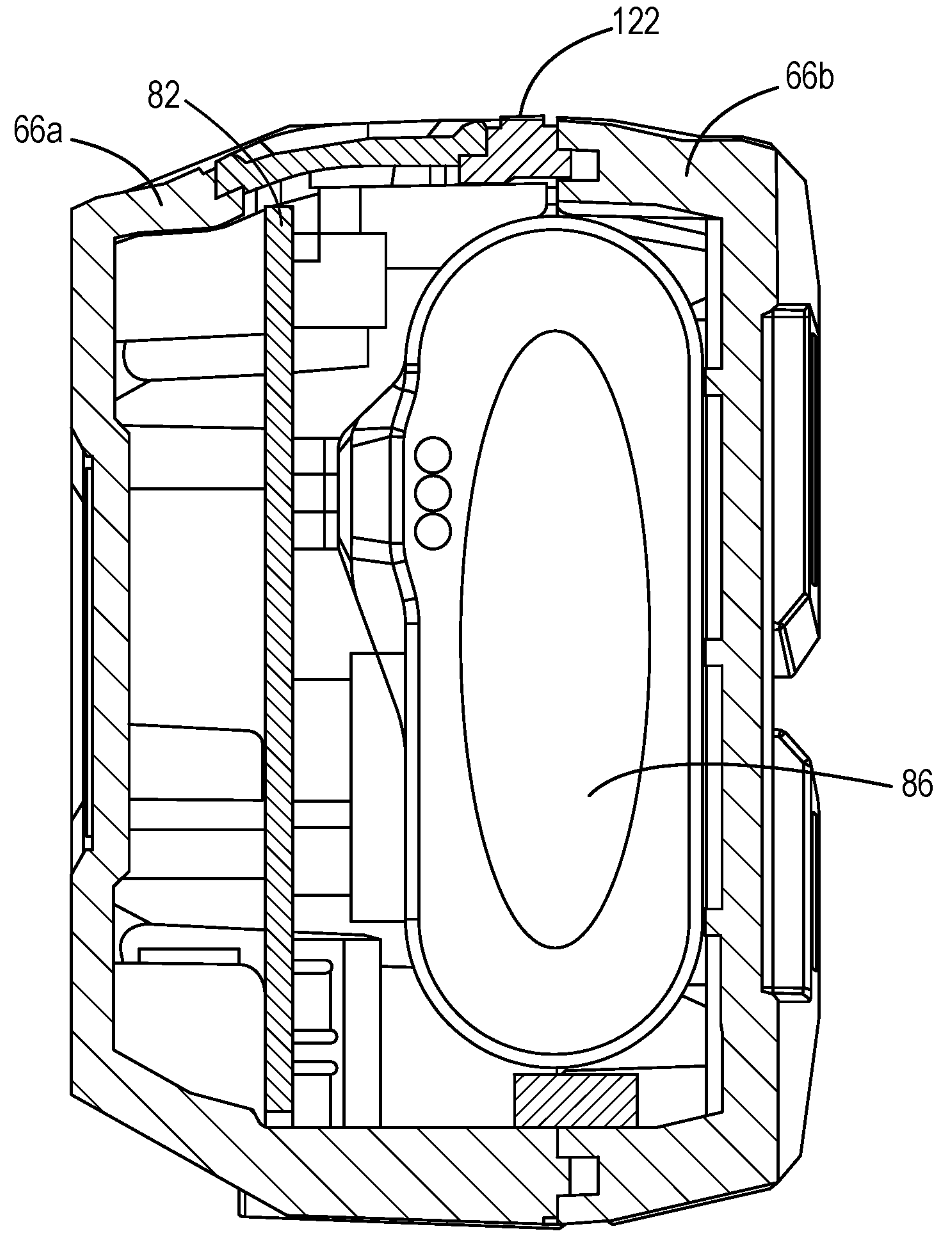
FIG. 3D is a cross-sectional view of the second light assembly of the headlamp of FIG. 1A.

As shown in FIG. 3C, the second light assembly 22 further includes a circuit board 82 (e.g., a PCB) and a battery pack 86 disposed within the housing 66. The second light assembly 22 includes a battery receptacle 90 that receives the battery pack 86. In the illustrated embodiment, the battery pack 86 is a dedicated battery pack, such as a rechargeable Li-ion battery pack. In other embodiments, the battery receptacle 90 may instead receive disposable alkaline batteries (e.g., AA batteries or the like). The circuit board 82 includes power terminals 94 that connect to the battery pack 86 and electrically couple the battery pack 86 to the circuit board 82, such that the circuit board 82 receives power from the battery pack 86. Two support pieces 98 are provided between the battery pack 86 and the circuit board 82. Both the battery pack 86 and the circuit board 82 abut the two support pieces 98 to maintain a space between the battery pack 86 and the circuit board 82. The support pieces 98 may be coupled to the battery pack 86 by, for example, adhesives. As such, the support pieces 98 are supported on the battery pack 86. In the illustrated embodiment, the support pieces 98 are support pads and may be made of a relatively soft material (e.g., rubber, foam, etc.). The illustrated support pieces 98 are also non-conductive. In other embodiments, the support pieces 98 may be made of other materials. Additionally, the second light assembly 22 may include fewer or more support pieces 98.

A charging port 102 configured to receive a charge from an external power supply is provided on the circuit board 82. The charging port 102 is accessible through the housing 66. As such, a charging cable can be coupled to the second light assembly 22 to charge the battery pack 86. In the illustrated embodiment, the charging port 102 is a USB-C port configured to receive a USB-C cable. In other embodiments, the charging port 102 may be a different type of charging port 102. A cover 106 is coupled to the housing 66 adjacent the charging port 102. The cover 106 may be made of a flexible material, such as rubber. The cover 106 is movable between a first position in which the cover 106 covers the charging port 102 and a second position in which the charging port 102 is exposed.

With continued reference to FIG. 3C, the second light assembly 22 further includes at least one LED 110 (also referred to herein as "at least one rear LED 110"). The LED 110 may also be referred to as a second LED 110. The at least one rear LED 110 of the second light assembly 22 is configured to operate in a second plurality of lighting modes, as will be described in more detail below. In the illustrated embodiment, the at least one rear LED 110 includes a plurality of LEDs. The plurality of LEDs 110 includes a first set of two LEDS and a second set of two LEDs. In other embodiments, the second light assembly 22 may include fewer or more LEDs. The first and second sets of two LEDs 110 are provided on opposite ends of the circuit board 82. In other embodiments, the plurality of LEDs may be distributed otherwise on the circuit board 82. The second light assembly 22 further includes a first lens 114*a* coupled to the first housing portion 66*a* adjacent the first set of two LEDs 110 and a second lens 114*b* coupled to the first housing portion 66*a* adjacent the second set of two LEDs 110. In the illustrated embodiment, the first lens 114*a* and the second lens 114*b* are transparent and red. In other embodiments, the first lens 114*a* and the second lens 114*b* may be a different color, such as blue, green, yellow, etc., and may be transparent. In some embodiments, the LEDs themselves may be configured to emit colored light (e.g., LEDs may be configured to emit red light, blue light, green light, etc., when excited by electrical current). LEDs may optionally be configured to emit yellow or white light, in some cases, if a colored lens is present.

The first housing portion 66*a* includes an aperture 118 sized to receive the insulated wire 26. The apertures 118 is located on a side or end of the first housing portion 66*a*. A gasket 120 (e.g., a rubber ring) surrounds the insulated wire 26 and fits within the aperture 118. The gasket 120 inhibits liquid and other debris from entering the housing 66. The battery pack 86 is coupled to the insulated wire 26. As such, the LED strip 54 in the first light assembly 18 is electrically connected to the battery pack 86 in the second light assembly 22 via the wire 26. An actuator 122 (FIG. 3A) is provided on the housing 66 and is electrically connected to the circuit board 82. Both the at least one front LED 54*b* and the at least one rear LED 110 are electrically connected to the circuit board 82 and receive power therefrom. As such, the actuator 122 is operable to turn the at least one front LED 54*b* of the front light assembly ON and OFF. The actuator 122 is also operable to toggle the at least one front LED 54*b* between the first plurality of lighting modes. In some examples, toggling between the first plurality of lighting modes adjusts an intensity of the at least one front LED 54*b*. The actuator 122 is further operable to turn the at least one rear LED 110 of the rear light assembly ON and OFF. The actuator 122 is also operable to toggle the at least one rear LED 110 between the second plurality of lighting modes. In some examples, toggling between the second plurality of lighting modes adjusts a flash rate of the at least one rear LED 110. In the illustrated embodiment, the actuator 122 is a push button. In other embodiments, the actuator 122 may be a rotatable dial, slider switch, and the like.

Figure 4:
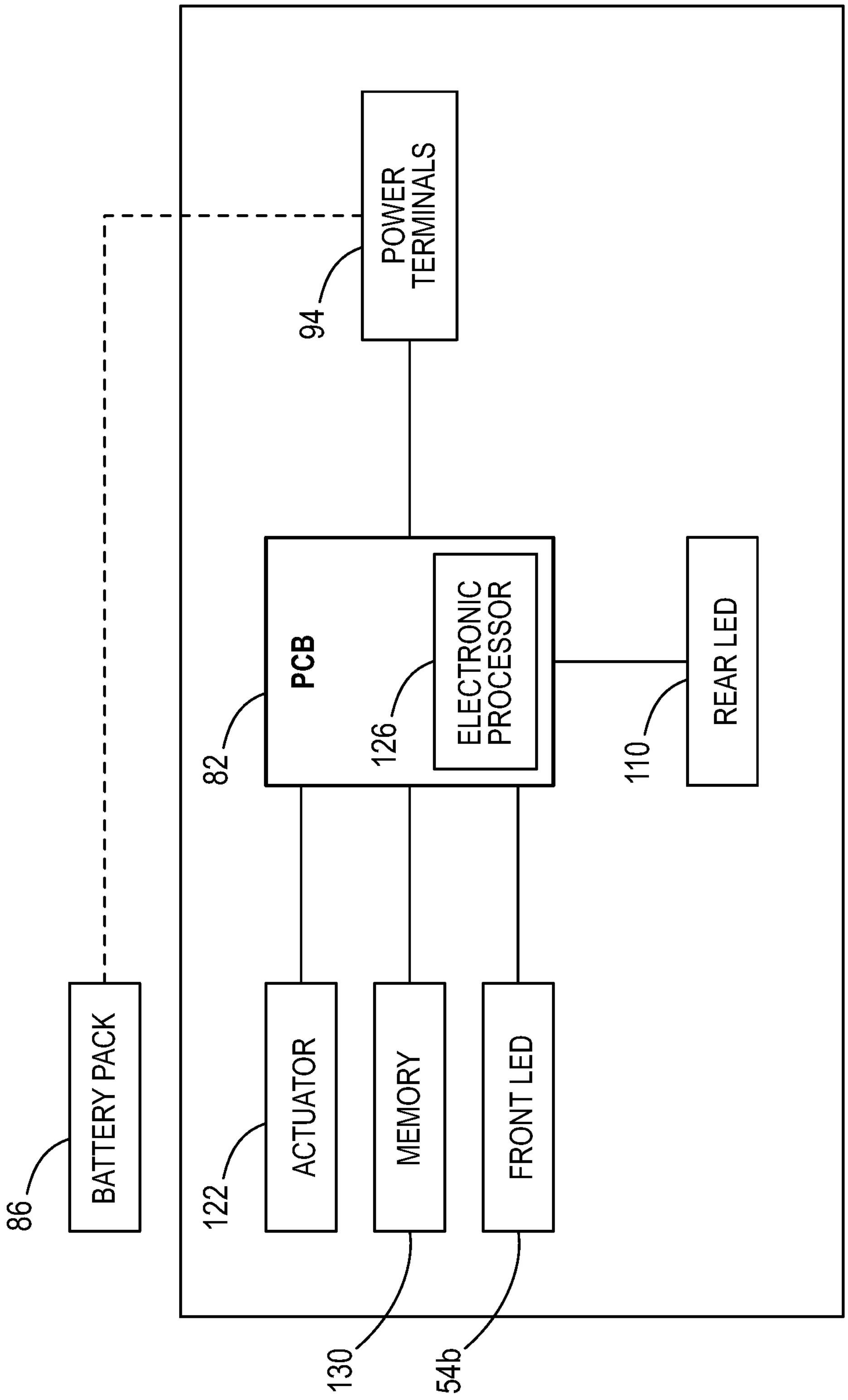
FIG. 4 is a block diagram of the headlamp of FIG. 1A, according to an example embodiment.

FIG. 4 is an example block diagram of the headlamp 10, which includes an electronic processor 126 that may be supported by the circuit board 82, in one embodiment. The electronic processor 126 is configured to implement several control circuits such as a main control circuit, a charging circuit, a light source enabling circuit, and the like. In the illustrated embodiment, the electronic processor 126 is electrically coupled to a variety of components of the headlamp 10 and includes electrical and electronic components that provide power, operational control, and protection to the components of the headlamp 10. In some embodiments, the electronic processor 126 includes, among other things, a processing unit (e.g., a microprocessor, a microcontroller, or another suitable programmable device).

In the illustrated embodiment, the electronic processor 126 includes a memory 130 (for example, a non-transitory, computer-readable medium) that includes one or more devices (for example, RAM, ROM, flash memory, hard disk storage, etc.) for storing data and/or computer code for completing or facilitating the various processes, layers, and modules described herein. The electronic processor 126 is configured to retrieve data from the memory 130 and execute, among other things, instructions related to the control processes, algorithms, and methods described herein. The electronic processor 126 is also configured to store/write information on/to the memory 130. For example, the memory 130 can store information regarding the last used mode of the headlamp 10 before the headlamp 10 is turned OFF.

In the illustrated embodiment, the actuator 122 includes a contact that receives power through the circuit board 82 and is configured to provide a status of the actuator 122 back to the electronic processor 126, which receives a signal from the actuator 122 based on the status. The electronic processor 126, in turn, interprets the status and signal of the actuator 122 and sends a signal in accordance with the flowchart showing the process in FIG. 5. Stated another way, the electronic processor 126 sets an operational mode based on detected actuation of the actuator 122. In addition to detecting whether the actuator 122 has been actuated, the electronic processor 126 is also configured to sense a duration (e.g., time (t) measured in seconds) of actuation. As described in greater detail below, the operational mode of the headlamp 10 changes in response to the actuator 122 being actuated for different amounts of time.

The operational modes of the headlamp 10 comprise the first plurality of lighting modes of the at least one front LED 54*b* and the second plurality of lighting modes of the at least one rear LED 110. The first plurality of lighting modes includes an OFF mode, a high output luminescence ON mode ("HIGH mode"), a medium output luminescence ON mode ("MEDIUM mode"), and a low output luminescence ON mode ("LOW mode"). The second plurality of lighting modes include an OFF mode, a non-flashing ON mode ("STEADY mode"), a fast flashing ON mode ("FAST FLASH mode"), and a slow flashing ON mode ("SLOW FLASH mode"). In other embodiments, the headlamp 10 may include fewer or more modes. Additionally, or alternatively, the headlamp 10 may include different types of modes. In alternative embodiments, one of the at least one front LED 54*b* and the at least one rear LED 110 may only operate in a single lighting mode. In the OFF modes, the at least one front LED 54*b* and the at least one rear LED 110 do not emit light.

During operation of the headlamp 10, the expectation of the user is that each mode emits a brightness/light type suitable for a desired application or scenario. The multiple modes of the headlamp 10 allow the user to advantageously switch between outputs without requiring the user to switch headlamps. Stated another way, the headlamp 10 is configured to accomplish the functions of a variety of headlamps such that the user can rely on a single headlamp 10 rather than needing multiple headlamps depending on the desired application (e.g., a first headlamp 10 with high lumen output for area lighting, a second headlamp 10 with medium lumen output for recreation, a separate flashing safety light, etc.).

Figure 5:
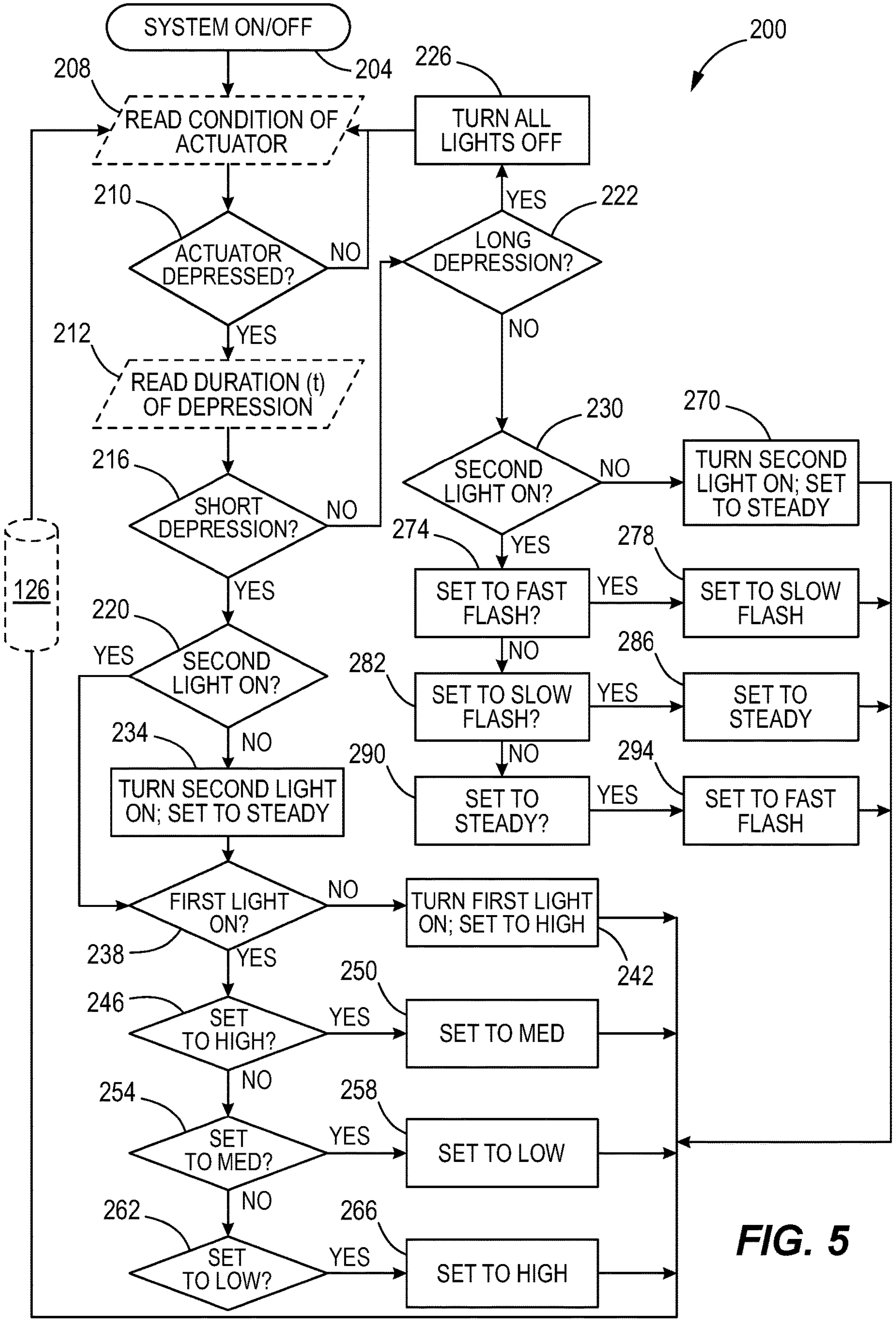
FIG. 5 is a flow chart of the headlamp of FIG. 1A, illustrating a process for selecting a desired operating or output mode, according to an example embodiment.

With specific reference to the flowchart of FIG. 5, an example process 200 for controlling the headlamp 10 will now be described in greater detail. The process 200, which is implemented by the electronic processor 126 in one example, may include additional steps or functions not specifically discussed herein (e.g., reading a state-of-charge to confirm the flashlight has sufficient power, reading a temperature to confirm to flashlight can be operated safely, etc.). In addition, not all the of steps of the process 200 need to be performed or need to be performed in the order presented.

At process block 204, the headlamp 10 is turned ON/OFF, such as by a user actuating the actuator 122. At process block 208, a condition of the actuator 122 (e.g., is the actuator 122 depressed/being pressed) is determined. A condition, state, and previous operating mode may each be stored to the memory 130 and accessed by the electronic processor 126 simultaneously. The memory 130 may further store the code/data needed to implement the process 200. In some embodiments, the data is stored directly on the circuit board 82.

At process block 210, the electronic processor 126 determines whether the actuator 122 is being actuated. If the actuator 122 is not being actuated, then the process 200 loops back to reading the conditions at block 208. If the actuator 122 is being actuated, the process 200 proceeds to block 212, where the electronic processor 126 reads a amount of time that the actuator 122 is being actuated. The actuation duration may be measured in seconds by the electronic processor 126.

In some embodiments, the actuator 122 is depressible for three different amounts of time (t) and is configured to provide a signal to the electronic processor 126 based on the different amounts of time (t). The actuator 122 may be actuated a first amount of time to toggle the at least one front LED 54*b* between the first plurality of lighting modes. In one example, the actuator 122 may be actuated the first amount of time to turn ON the at least one front LED 54*b*. In the illustrated embodiment, the first amount of time may less than 1 second. The first amount of time may also be considered a momentary actuation or short depression that corresponds to a first signal. The actuator 122 may be actuated for the short depression to cycle the at least one front LED 54*b* between the HIGH, MEDIUM, and LOW modes. The actuator 122 may be actuated a second amount of time that is different than the first amount of time to turn on the at least one rear LED 110. The actuator 122 may be actuated a second amount of time to toggle the at least one rear LED 110 between the second plurality of lighting modes. In one example, the actuator 122 may also be actuated the second amount of time to cycle the at least one rear LED 110 between the STEADY, FAST FLASH, and SLOW FLASH modes. In the illustrated embodiment, the second amount of time is greater (e.g., longer) than the first amount of time and may be 1 or more seconds (e.g., approximately 1 to 3 seconds). The second amount of time may also be considered a medium depression that corresponds to a second signal different than the first signal. The actuator 122 may be actuated a third amount of time that is different than the first and second amounts of time to turn both the at least one front LED 54*b* and the at least one rear LED 110 OFF. The actuator 122 may be actuated the third amount of time to toggle both the at least one front LED 54*b* and the least one rear LED 110. In the illustrated embodiment, the third amount of time is greater (e.g., longer) than the second amount of time and may be 3 or more seconds (e.g., approximately 3 to 5 seconds). The third amount of time may also be considered a long depression that corresponds to a third signal different than the first and second signals. The first amount of time, the second amount of time, and third amount of time may also be referred to as a first length of time, a second length of time, and a third length of time respectively.

In the illustrated embodiment, once the time of actuation is determined in block 212, the process 200 proceeds to block 216, where the electronic processor 126 associates a command based on the duration or time of actuation. At process block 216, the electronic processor 126 determines if the time of actuation is within the first duration of time (e.g., the time of actuation is less than 1 second) by receiving a signal from the actuator 122. If the time of actuation is within the first duration of time, the process 200 proceeds to block 220, where the electronic processor 126 retrieves the state of the at least one rear LED 110. If the time of actuation is not within the first duration of time (e.g., the time of actuation is greater than 1 second), the process 200 proceeds to block 222, where the electronic processor 126 determines if the time of actuation is within the third duration of time (e.g., the time of actuation is greater than 3 seconds) by receiving a signal from the actuator 122. If the time of actuation is within the third duration of time, the process 200 proceeds to block 226, where the electronic processor 126 turns OFF both the at least one front LED **54*b* and the at least one rear LED 110. The process 200 then returns to block 208, in which a condition of the actuator 122 is determined. If the time of actuation is not within the third duration of time (e.g., the time of actuation is greater than 1 second and less than 3 seconds), the process 200 proceeds to block 230, where the electronic processor 126 retrieves the state of the at least one rear LED 110**.

After a short depression, if the state is OFF (i.e., the at least one rear LED 110 is OFF), then the electronic processor 126 turns the at least one rear LED 110 ON and sets the operating mode to the STEADY mode, as shown at block 234. The process then proceeds to block 238, where the electronic processor 126 retrieves the state of the at least one front LED **54*b*. After a short depression, if the state is ON (i.e., the at least one rear LED 110 is ON), then the process also proceeds to block 238. In this manner, the at least one rear LED 110 is always ON while the at least one front LED 54*b* is ON. In other embodiments, blocks 220 and 234** may not be present.

If the at least one front LED **54*b* is OFF, the process proceeds to block 242, where the electronic processor 126 will set the at least one front LED 54*b* ON in the HIGH mode. In the illustrated embodiment, the HIGH mode is automatically set as the default operating mode such that the electronic processor 126 will set the at least one front LED 54*b* to the HIGH mode after the at least one front LED 54*b* has been OFF. In other embodiments, the MEDIUM mode or LOW mode may alternatively be set as a default operating mode. If the state is ON (i.e., at least one front LED 54*b* is ON), then the electronic processor 126 reads the current operating mode of the at least one front LED 54*b* and cycles the at least one front LED 54*b* to the next mode (i.e., HIGH, MEDIUM, or LOW) in the order of operating modes. For example, if the at least one front LED 54*b* ON in the HIGH mode (block 246), the electronic processor 126 will switch the at least one front LED 54*b* to the MEDIUM mode, as shown at block 250; if the at least one front LED 54*b* ON in the MEDIUM mode (block 254), the electronic processor 126 will switch the at least one front LED 54*b* to the LOW mode, as shown at block 258; and if the at least one front LED 54*b* ON in the LOW mode (block 262), the electronic processor 126 will switch the at least one front LED 54*b* to the HIGH mode, as shown at block 266**.

In the illustrated embodiment, the order of operating modes for the at least one front LED **54*b* may be cycled through in a re-occurring order from HIGH to MEDIUM to LOW to HIGH to MEDIUM to LOW, etc. In other embodiments, the order of modes may be reversed. Additionally, the at least one front LED 54*b* may be cycled through less than or more than three modes. Although the example process 200 allows the electronic processor 126 to turn the at least one front LED 54*b* ON when the time of actuation is less than 1 second (block 216), other processes for the headlamp 10 may allow the electronic processor 126 to turn the at least one front LED 54*b* ON when the time of actuation is greater than 1 second. After setting the mode of the at least one front LED 54*b*, the process returns to block 208, where the electronic processor 126 determines the condition of the actuator 122**.

Referring back to block 212, if the time of actuation read in block 216 is within the second duration of time (e.g., greater than 1 second and less than 3 seconds), the process 200 proceeds to block 230, in which the electronic processor 126 retrieves the state of the at least one rear LED 110. If the at least one rear LED 110 is OFF, the process proceeds to block 270, where the electronic processor 126 will set the at least one rear LED 110 ON in the STEADY mode. In the illustrated embodiment, the STEADY mode is automatically set as the default operating mode such that the electronic processor 126 will set the at least one rear LED 110 to the STEADY mode after the at least one rear LED 110 has been OFF. In other embodiments, the FAST FLASH mode or SLOW FLASH mode may alternatively be set as a default operating mode. If the state is ON (i.e., the at least one rear LED 110 is ON), then the electronic processor 126 reads the current operating mode of the at least one rear LED 110 and cycles the at least one rear LED 110 to the next mode (i.e., STEADY, FAST FLASH, or SLOW FLASH) in the order of operating modes. For example, if the at least one rear LED 110 ON in the FAST FLASH mode (block 274), the electronic processor 126 will switch the at least one rear LED 110 to the SLOW FLASH mode, as shown at block 278; if the at least one rear LED 110 ON in the SLOW FLASH mode (block 282), the electronic processor 126 will switch the at least one rear LED 110 to the STEADY mode, as shown at block 286; and if the at least one rear LED 110 ON in the STEADY mode (block 290), the electronic processor 126 will switch the at least one rear LED 110 to the FAST FLASH mode, as shown at block 294.

In the illustrated embodiment, the order of operating modes for the at least one rear LED 110 may be cycled through in a re-occurring order from STEADY to FAST FLASH to SLOW FLASH to STEADY to FAST FLASH to SLOW FLASH, etc. In other embodiments, the order of modes may be reversed. Additionally, the at least one rear LED 110 may be cycled through less than or more than three modes. Although the example process 200 allows the electronic processor 126 to cycle through operating modes for the at least one rear LED 110 when the time of actuation is within 1 to 3 seconds (blocks 216, 222), other processes for the headlamp 10 may allow the electronic processor 126 to cycle through operating modes for the at least one rear LED 110 when the time of actuation not within 1 to 3 seconds. After setting the mode of the at least one rear LED 110, the process 200 returns to block 208, where the electronic processor 126 determines the condition of the actuator 122.

In some embodiments, the third amount of time may have a maximum length. For example, if the time of actuation read in block 222 is greater than 5 seconds, the electronic processor 126 may consider the actuation to be an accidental depression and not change the state of the at least one front and rear LEDs 54*b*, 110.

In the illustrated embodiment, the actuator 122 includes a single actuatable member, such as a single push-button or switch, that allows the user to step through the process 200. In other embodiments, the actuator 122 may include separate actuatable members that are independently operable to control the at least one front LED 54*b* and the at least one rear LED 110. In still other embodiments, the actuator 122 may include a single actuatable member to turn the at least one front and rear LEDs, ON and OFF as described above, but may include a separate actuatable member (e.g., a mode actuator) to change the operating modes of the at least one front and rear LEDs 54*b*, 110.

Although the disclosure has been described in detail with reference to certain preferred embodiments, variations and modifications exist within the scope and spirit of one or more independent aspects of the disclosure as described. Various features of the disclosure are set forth in the following claims.

What is claimed is:

1. A headlamp comprising:

a strap configured to conform to a user's head or to a hardhat;

a first light assembly including a first housing coupled to the strap and a first LED operable in a first plurality of lighting modes; and a second light assembly electrically coupled to the first light assembly, the second light assembly including:

a second housing coupled to the strap and spaced apart from the first housing along the strap, a second LED operable in a second plurality of lighting modes, a battery receptacle configured to receive a battery pack, and an actuator supported on the second housing and operable to toggle the first LED between the first plurality of lighting modes and the second LED between the second plurality of lighting modes.

2. The headlamp of claim 1, wherein toggling between the first plurality of lighting modes adjusts an intensity of the first LED.

3. The headlamp of claim 2, wherein toggling between the second plurality of lighting modes adjusts a flash rate of the second LED.

4. The headlamp of claim 1, wherein actuating the actuator for a first amount of time toggles the first LED between the first plurality of lighting modes, wherein actuating the actuator for a second amount of time toggles the second LED between the second plurality of lighting modes, and wherein the second amount of time is different than the first amount of time.

5. The headlamp of claim 1, wherein the first housing includes a flexible housing that supports the first LED.

6. The headlamp of claim 5, wherein the first LED is one of a plurality of LEDs arranged in a line parallel to a longitudinal axis of the flexible housing.

7. The headlamp of claim 1, wherein the battery pack is a rechargeable Li-ion battery pack.

8. A headlamp comprising:

a first light assembly including a first LED; and a second light assembly electrically coupled to the first light assembly, the second light assembly including:

a housing, a battery pack positioned within the housing, a circuit board positioned between the battery pack and the housing, a second LED supported by the circuit board, a support pad positioned on the battery pack and engaging the circuit board to maintain a space therebetween, the support pad is non-conductive, and an actuator operable to control operation of the first LED and the second LED.

9. The headlamp of claim 8, wherein the housing has a first housing portion and a second housing portion, and wherein the first housing portion is joined to the second housing portion by a fastener.

10. The headlamp of claim 8, wherein the circuit board includes a charging port that is accessible through the housing to charge the battery pack.

11. The headlamp of claim 8, wherein the housing defines an aperture, and further comprising a wire extending through the aperture to electrically connect to the battery pack to the first light assembly.

12. The headlamp of claim 11, wherein the second light assembly also includes a gasket that surround the wire and is positioned within the aperture.

13. The headlamp of claim 8, wherein the first light assembly includes a flexible housing that supports the first LED.

14. The headlamp of claim 8, further comprising a strap configured to conform to a user's head or to a hardhat, and wherein the first light assembly and the second light assembly are coupled to the strap.

15. A headlamp comprising:

a strap configured to conform to a user's head or to a hardhat;

a first light assembly coupled to the strap, the first light assembly including a flexible housing and a plurality of first LEDs operable in a first plurality of lighting modes;

a second light assembly coupled to the strap and spaced apart from the first light assembly, the second light assembly comprising:

a second LED operable in a second plurality of lighting modes, a battery receptacle configured to receive a battery pack, and an actuator operable to toggle the plurality of first LEDs between the first plurality of lighting modes and the second LED between the second plurality of lighting modes based upon an amount of time the actuator is depressed; and a wire extending from the second light assembly to the first light assembly to electrically couple the battery receptacle to the plurality of first LEDs.

16. The headlamp of claim 15, wherein actuating the actuator for a first amount of time toggles the plurality of first LEDs between the first plurality of lighting modes, wherein actuating the actuator for a second amount of time toggles the second LED between the second plurality of lighting modes, and wherein the second amount of time is different than the first amount of time.

17. The headlamp of claim 16, wherein actuating the actuator for a third amount of time toggles both the plurality of first LEDs and the second LED, and wherein the third amount of time is different than the first amount of time and the second amount of time.

18. The headlamp of claim 16, wherein the second amount of time is longer than the first amount of time.

19. The headlamp of claim 15, wherein toggling between the first plurality of lighting modes adjusts an intensity of the plurality of first LEDs, and wherein toggling between the second plurality of lighting modes adjusts a flash rate of the second LED.

20. The headlamp of claim 8, wherein the support pad is configured to provide cushioning between the battery pack and the circuit board.

* * * * *